United States Patent [19]

Tsuji et al.

[11] Patent Number: 5,018,120
[45] Date of Patent: May 21, 1991

[54] OPTICAL RECORDING MEDIUM TRACK INDEXING SYSTEM

[75] Inventors: Kentaroh Tsuji, Nara; Tsuneo Fujiwara, Tenri; Hiroshi Fuji, Nara; Shigeo Terashima; Tomiyuki Numata, both of Tenri, all of Japan

[73] Assignee: Sharp Kabushiki Kaisha, Osaka, Japan

[21] Appl. No.: 284,669

[22] Filed: Dec. 15, 1988

[30] Foreign Application Priority Data

Dec. 18, 1987 [JP] Japan .................................. 62-322081

[51] Int. Cl.$^5$ ............................................... G11B 7/00
[52] U.S. Cl. ........................................ 369/32; 369/57; 369/275.3
[58] Field of Search ...................... 360/72.1, 72.2, 114; 369/13, 32, 57, 44.26, 275.1, 275.3; 358/341, 343, 342

[56] References Cited

U.S. PATENT DOCUMENTS 4,535,439 8/1985 Satoh et al. ..................... 369/275.3
4,761,692 8/1988 Yoshida et al. ................. 358/342 X Primary Examiner—Robert L. Richardson

[57] ABSTRACT

An optical disc medium indexing system having a plurality of elongated parallel tracks wherein each track contains a nonerasable index portion located in less than a single frame. The index portions are formed on the substrate of the disc by a plurality of indentations representing the absolute address of each track on the disc recorded in a multiplex format. Each index portion containing information on the mark, track number and CRC. The disc is constructed so that information may be recorded on the entire surface of the medium including the indexed portions.

1 Claim, 3 Drawing Sheets

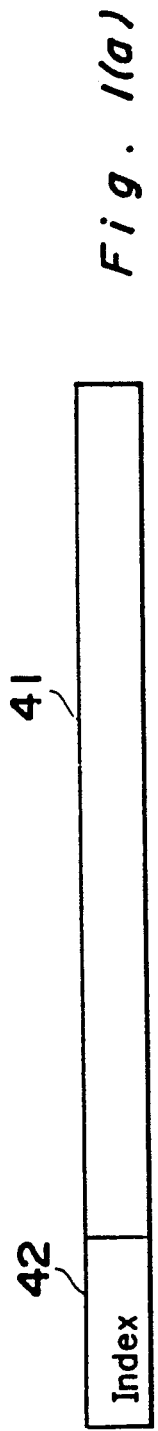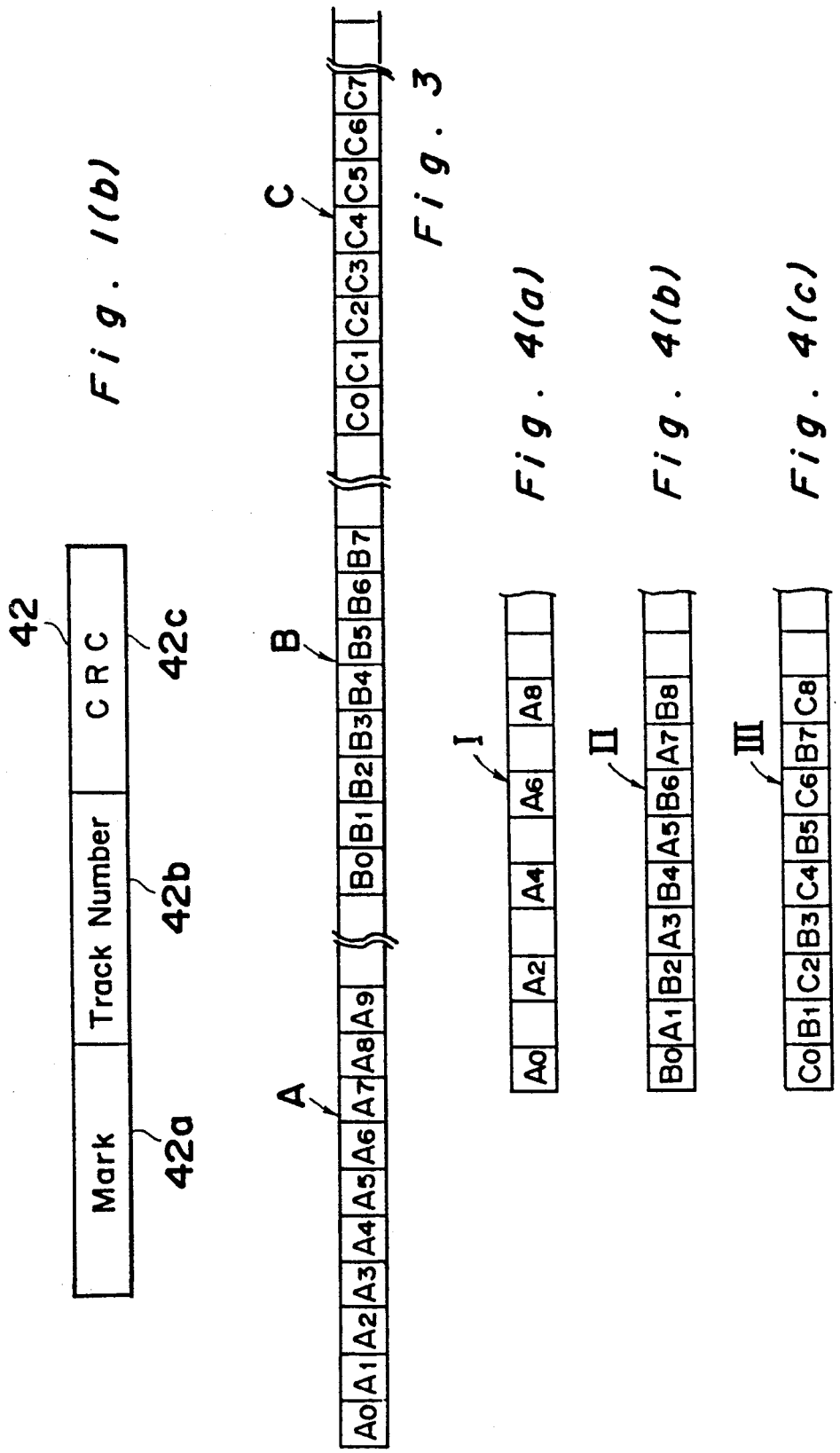

OPTICAL RECORDING MEDIUM TRACK INDEXING SYSTEM

BACKGROUND OF THE INVENTION

1. Field of the Invention

The present invention generally relates to a disc-shaped information carrier medium such as an optical disc or a magneto-optical disc and, more particularly, to the format of an index region of the information carrier medium.

For the purpose of the present invention, the term "optical disc" hereinafter referred to and used in the appended claims is to be understood as including not only a compact optical disc, but also a magneto-optical disc.

2. Description of the Prior Art

Conventional optical disc, typically contain at least one index region having an index such as the track number provided for each track on the optical disc.

According to the prior art, only the index is recorded in the index region. Therefore, the provision of an index region correspondingly reduces the information storage capacity of the optical disc as a whole. In addition, where the disc contains a substantial amount of information such as a long-time music or video recording or playback such use necessitates a memory buffer for the index region. Which buffer is required to have a relatively large storage capacity making it impossible, or impractical to record the information involving a long-time video or music recording or playback.

In particular, the problem associated with the recording large amounts of information such as the long-time recording or playback has obstructed the development of an digital audio disc or video disc having a capacity large enough to accommodate such information.

In order to eliminate the above discussed problems, the information can be recorded on the index region in a multiplex recording fashion.

However, it has been found that multiplex recording of information on a index region of the optical disc often causes a considerable reduction in signal reproduction quality and cannot provide a support for an error correction.

SUMMARY OF THE INVENTION

The present invention has been devised with a view toward substantially eliminating the above discussed problems and has for its primary object to provide an improved optical disc of a type having at least one index region for each track, characterized in that the length of each of the index regions is chosen to be smaller than one frame and information is adapted to be recorded on the index region in a multiple recording fashion.

According to the present invention, each of the index regions in the optical disc has a length smaller than one frame. When information recorded on the optical disc is decoded, information of one frame on the optical disc is, after decoding, dispersed into two frames. Therefore, if an error occurs in recording the information recorded on the index region in multiplex recording fashion, since length of the index region is within one frame, the number of frame errors after the decoding is usually within the two frames. Also even if the index region extends over two frames on the optical disc, number of the frame errors after decoding will be within three frames. In this way, since the number of frame errors per track increases as a result of the multiplex recording of information on the index region within three frames, reduction in reliability of the reproduced signal is slight and an increase in the number of frame errors does not hamper the capability of correcting with an error correction.

BRIEF DESCRIPTION OF THE DRAWINGS

This and other objects and features of the present invention will become clear from the following description taken in conjunction with a preferred embodiment thereof with reference to the accompanying drawings, in which:

FIG. 1(a) is a diagram used to explain the format of a track on an optical disc;

FIG. 1(b) is a diagram showing the details of an index region;

FIG. 3(a) is a diagram used to explain the arrangement of frames;

FIGS. 4(a) to 4(c) are diagrams used to explain the arrangement of the frames after the decoding.

DETAILED DESCRIPTION OF THE EMBODIMENT

Figure 2:
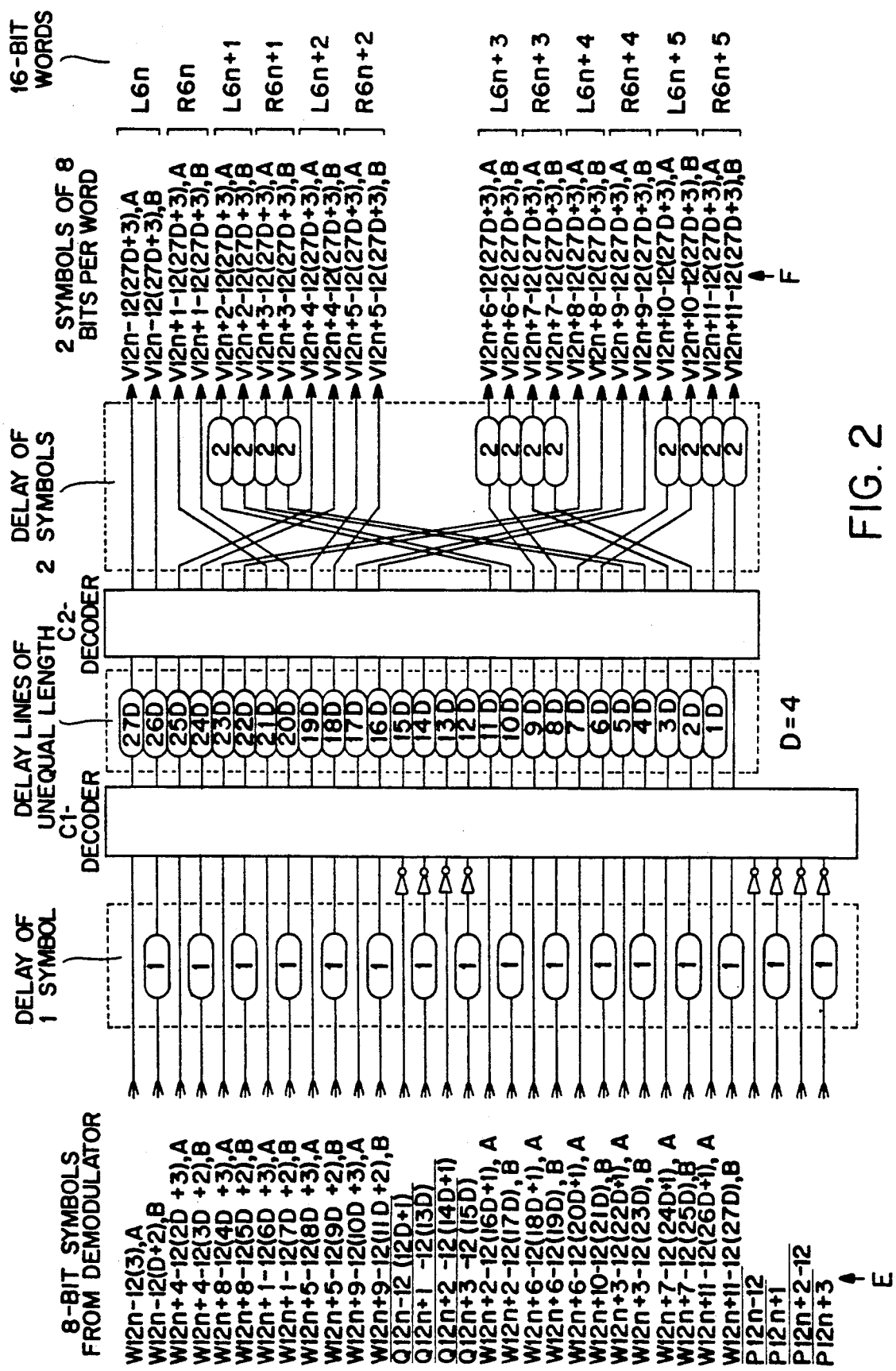
FIG. 2 is a diagram used to explain a decoding circuit for decoding information recorded on the optical disc.

FIGS. 1(a) and 1(b) illustrate one example of the format of each track in an optical disc according to the present invention. A magneto-optical disc was formed by depositing an AlN film of 80 nm, a GdTbFe amorphous film of 20 nm, an AlN film of 25 nm and an Al film of 50 nm on a glass substrate and radiating a laser beam from the glass substrate side to effect a recording at Curie point. The disc is of a type wherein reproduction of information recorded thereon is carried out by radiating a double polarized laser beam to detect the rotation of a polarizing plane of a reflected light by the magneto-optical effect.

As shown in FIG. 1(a), each track 41 is provided with at least one index region 42 on which indexes such as the track number, i.e., the number allocated to the particular track 41 and others, are recorded. As shown in FIG. 1(b) the index region 42 is comprised of a marking area 42a indicative of the heading of the index region 42, a track number area 42b indicative of the track number in which such index region 42 is included, and a CRC (cyclic redundancy check) area 42c for the detection of a bit error in the track number area 42b. The index region 42 is recorded on the optical disc in the form of a series of indentations formed on the glass substrate by the use of an etching technique during the manufacture of the optical disc. Accordingly, although it is possible to record information on the index region 42 in a multiple recording fashion or to reproduce or erase the information so recorded on the optical disc, it is not impossible to erase the index region 42 itself.

A decoding portion having an error correcting capability based on a cross-interleaved Solomon system (hereinafter referred to as "CIRC System") which is an error correcting method used in connection with a compact optical disc is shown in FIG. 2. One frame of the optical disc includes, as indicated by E in FIG. 2, 24 symbol information indicated by codes 0 to 11 and 16 to 27, and 8 symbol parities for the error detection and correction as indicated by codes 12 to 15 and 28 to 31 and, when this is decoded, 24 symbol information shown by F in FIG. 24 can be obtained as corrected if the error exists. It is to be noted that each symbol consists of 8 bits.

When the decoding has taken place in the decoding portion shown in FIG. 2, the symbol included in each frame on the optical disc is dispersed into two frames. By way of example, symbols $A_0, A_1, A_2, \ldots$ of one frame A on the optical disc as shown in FIG. 3 are dispersed into two frames I and II shown in FIGS. 4(a) and 4(b), respectively, and symbols $B_0, B_1, B_2, \ldots$ of one frame B on the optical disc as shown in FIG. 3 are dispersed into two frames II and III as shown in FIG. 4(b) and 4(c). Accordingly, if an error of only one symbol occurs in one frame on the optical disc, an error occurs in one frame after the decoding, and if an error of 2 to 32 symbols occurs in one frame on the optical disc, an error occurs usually in two frames after the decoding. Even though the length of the index region 42 is chosen to be within one frame, the index region 42 may extend over two frames and, in such a case, if an error occurs in the information at the index region 42, an error will occur in a maximum of three frames after decoding. In this way, if the length of the index region 42 is chosen to be within one frame, even though an error in the information recorded on the index region 42 in a multiplex recording fashion, the maximum number of frame errors after decoding will be three and corresponding to 0.2% of the average number of frames on each track, which average number is about 1500 (line velocity: 1.3 m/s, Radial position of Disc: 41.5 mm).

Figure 5:
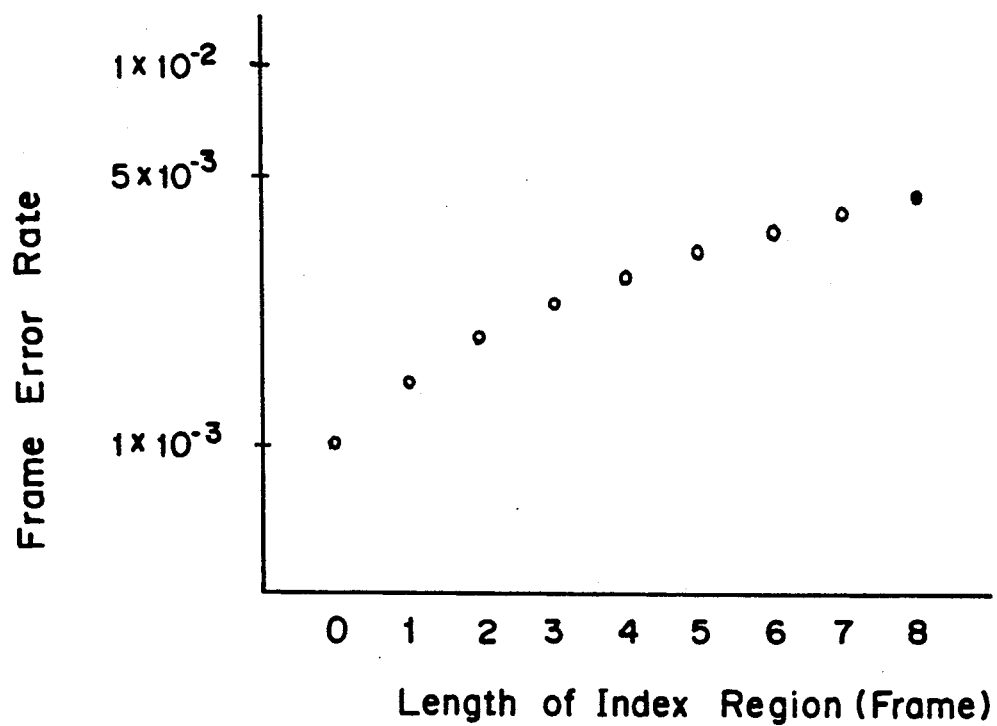
FIG. 5 is a graph showing the relationship between the length of the index region and the frame error rate.

Hereinafter, the CIRC system will be discussed. With this system, most errors occurring in the optical disc can be corrected and, in particular, as far as a burst error which are continuous errors are concerned up to 450 symbols can be corrected (about 14 frames). Also, with respect to continuous errors over 450 symbols, corrections up to in 1500 symbols, are possible. Accordingly, as hereinbefore discussed, if the number of frame errors increased as a result of the multiplex recording of the information on the index region 42 is merely three frames, error correction can be effectively carried out and no reliability of the reproduced signal will be lowered. A result of measurement of the frame error rate exhibited by the actual error of the optical disc wherein the length of the index region 42 is varied is shown in FIG. 5. In FIG. 5, where the index region 42 is of a length greater than 8 frames, uncorrectable frames were found.

A modulation system for the index region 42 will now be discussed. The EFM system is generally used as an information modulating system in association with the compact optical disc. However, in the case of the modulating system for the index region 42, the employment of a system different from the information modulating system is preferred in order to minimize error detection. Also, in order to accomplish writing the same indexes with a minimized number of bits, a modulating system of high code rate is preferred for the modulation system for the index region 42.

In view of the foregoing, a so-called 8/10MNRZI system generally used in the digital audio tape recorder is preferred because it satisfies all of the above discussed conditions. When the index region 42 consists of one byte of the marking area 42a, 2 bytes of the track number area 42b and 2 bytes of CRC area 42c is recorded with the use of the 8/10MNRZI system, the recording bit length is 50 micrometers and, even if the minimum bit length is 1 micrometer, about 50 micrometer will suffice This value is sufficiently smaller as compared with the shortest value of one frame which is about 163 micrometers (in the case of the line velocity being 1.2 m/s). It is to be noted that the 8/10MNRZI system is well known and disclosed in, for example, the Japanese Laid-open Patent Publication No. 60-93857 and, therefore, the details of which will not be herein reiterated.

It is to be noted that, although in the foregoing embodiment the present invention has been described as applied to a magneto-optical disc, the present invention can be equally applicable to an optical disc of a phase variable type (amorphous phase$\theta$crystalline phase) wherein a recording medium formed by adding a slight amount of germanium or tin to a low oxide such as tellurium.

From the foregoing description of the present invention, it has become clear that the optical disc herein discloses is of a type having at least on index region for each track, which region has a length chosen to be smaller than one frame so that information can be recorded on the index region in a multiplex recording fashion.

While the length of each index region is chosen to be within one frame on the optical disc, when the information on the optical disc is decoded, the information of one frame on the optical disc is, after decoding, dispersed into two frames and, therefore, in the event that an error occurs in a information recorded on the index region in multiplex recording fashion, the number of frame errors after the decoding is usually within two frames. Also, even though the length of the index region may extend over the two frames, the maximum number of frame errors after the decoding will be three. In this way, since the maximum number of frame errors per track increases as a result of the multiplex recording of information on the index region resulting from the multiplex recording of information on the index region to three frames, reduction in reliability of the reproduced signal is slight and such an increase in number of the frame errors does not hamper the capability of correcting. Accordingly, since it is possible to record information on the index region in a multiplex recording fashion without the reliability of the reproduced signal being lowered, the capacity of the optical disc is substantially increased enough to permit recording of information involving a long-time playback.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disc recording medium for selectively storing or erasing information from an information bearing light, the medium comprising:
    an information recording layer for recording information from said information bearing light in a multiplex format;
    a substrate supporting said information recording layer having a first surface and a second surface, wherein said substrate is provided with a plurality of elongated substantially parallel tracks divided into frames, each of said tracks having an nonerasable index portion located in less than a single frame and formed by indentations in said second surface of said substrate representing the physical absolute address of each track in a multiplex format respectively.

* * * * *